US005467477A

United States Patent [19]

Furuta et al.

[11] Patent Number: 5,467,477

[45] Date of Patent: Nov. 14, 1995

[54] ANTENNA AND TUNER COMBINATION

[75] Inventors: Takashi Furuta; Hajime Takeda, both of Osaka; Hiroyuki Nishimura, Yawata; Tsuyoshi Kadono; Hirofumi Ishizaki, both of Osaka; Akira Uesaka, Ikoma, all of Japan

[73] Assignee: Matsushita Electric Works, Ltd., Kadoma, Japan

[21] Appl. No.: 875,678

[22] Filed: Apr. 29, 1992

[30] Foreign Application Priority Data

Nov. 21, 1991 [JP] Japan .................................... 3-306077

[51] Int. Cl.[6] ............................... H04B 1/08; H01Q 1/24

[52] U.S. Cl. .......................... 455/348; 455/351; 343/702; 343/882; 16/297

[58] Field of Search ................................. 455/3.2, 155.1, 455/280, 282, 288, 344, 347, 348, 349, 351, 151.2, 89, 90, 878; 343/700 MS FILE, 702, 882; 16/297, 308, 319, 349, 321

[56] References Cited

U.S. PATENT DOCUMENTS

| | | | |
|---|---|---|---|
| 4,295,224 | 10/1981 | Nishimura et al. | 455/170.1 |
| 4,644,366 | 2/1987 | Scholz . | |
| 4,661,992 | 4/1987 | Garay et al. | 455/129 |
| 4,801,943 | 1/1989 | Yabu et al. | 343/700 MS |
| 4,816,838 | 3/1989 | Mizuno et al. | 343/702 |
| 4,829,309 | 5/1989 | Tsukamoto et al. . | |
| 4,887,091 | 12/1989 | Yamada | 343/882 |
| 4,969,208 | 11/1990 | Okazaki | 455/151 |
| 5,019,833 | 5/1991 | Nonaka | 343/878 |
| 5,020,137 | 5/1991 | Barsumian . | |
| 5,037,231 | 8/1991 | Kitamura | 16/308 |
| 5,170,173 | 12/1992 | Krenz et al. | 455/89 |

FOREIGN PATENT DOCUMENTS

| | | | |
|---|---|---|---|
| 2632471 | 12/1989 | France . | |
| 2208106 | 9/1977 | Germany | 455/90 |
| WO89/06870 | 7/1989 | Germany . | |
| 63-87002 | 4/1988 | Japan . | |
| 190887 | 7/1989 | Japan | 16/319 |
| 289303 | 11/1989 | Japan | 343/700 MS |
| 2208189 | 3/1989 | United Kingdom . | |
| 2234651 | 2/1991 | United Kingdom | 455/347 |
| WO90/13951 | 11/1990 | WIPO | 455/90 |

*Primary Examiner*—Reinhard J. Eisenzopf
*Assistant Examiner*—Thanh Le
*Attorney, Agent, or Firm*—Armstrong, Westerman, Hattori, McLeland & Naughton

[57] ABSTRACT

A antenna and tuner combination for receiving microwaves from a broadcasting satellite includes a stand plate to be placed on a supporting surface and a planar antenna module connected by a hinge assembly to the stand plate so that the antenna module is movable between a folded position upon the stand plate and an extended position extending from the stand plate. An adjustor is included to adjust the antenna module to a desired angular disposition with respect to a plane of the stand plate and holding it at the desired angular disposition for keeping it oriented to the broadcasting satellite. A tuner is detachably mounted on the stand plate with its input terminal connected to a corresponding output terminal of the antenna module.

3 Claims, 5 Drawing Sheets

ANTENNA AND TUNER COMBINATION

BACKGROUND OF THE INVENTION

1. Field of the Invention

The present invention is directed to an antenna and tuner combination, and more particularly, to such a combination apparatus with a flat antenna module and a TV tuner adapted for use to be mounted indoor for receiving microwaves from a broadcasting satellite and providing a tuned output immediately available at a television set.

2. Description of the Related Art

In the field of receiving television programs carried on microwaves from a geostationary broadcasting satellite, a flat or planar antennas has been widely accepted due to its space-saving configuration and superior aesthetic appeal as compared to a parabolic antenna. Such flat antenna is normally installed at an outdoor site with its face oriented to the satellite and is connected through a cable to a TV tuner which is mounted indoor for selection of a particular broadcasting channel from the output of the antenna to give corresponding video and audio signals to a television set. However, it is rather inconvenient to install the antenna at an outdoor site and route the cable between the antenna and the tuner. Further, due to the fact that different installation sites require, in most cases, different lengths of the cable for interconnection between the antenna and the tuner, it is a common practice to cut the cable to a suitable length. A problem occurs in this respect that, because the cable should be a coaxial cable and is normally required to be connected to specially configured sockets of the antenna and the tuner, the coaxial cable should have insulation stripped of its ends to expose conductors and then be connected at the conductors to pin-plugs of a design complementary to the socket. Such wiring technique requires a degree of skill and is difficult to be made by an unskilled personnel or user. In this sense, there is a considerable burden on interconnecting the antenna and the tuner. Besides, when the antenna is mounted indoors adjacent windows or the like to catch the microwaves therethrough, it may sometimes become a hindrance when not in use.

SUMMARY OF THE INVENTION

The above problem has been successfully eliminated in the present invention which provides a unique antenna and tuner combination for receiving microwaves from a broadcasting satellite. The combination comprises a stand plate adapted to be placed upon a supporting surface and a flat planar antenna module connected by a hinge assembly to the stand plate in a supported relation thereto so as to be movable between a folded position upon the stand plate and an extended position extending from the stand plate. The antenna module includes an output terminal for providing an antenna output corresponding to the microwave received from the satellite. A tuner is detachably mounted on the stand plate and has an input terminal connected to the output terminal of the antenna module and a tuner output terminal providing video and audio signals to a television set. The combination includes an adjustor for adjusting the antenna module to a desired angular disposition with respect to a plane of the stand plate and holding it at that angular disposition. With this arrangement, the tuner acts to add a weight to the stand plate to thereby stably mount the antenna module on a suitable supporting surface without requiring any additional fittings. Also, the tuner can be internally connected to the antenna within the combination, eliminating the necessity of utilizing an additional coaxial cable and therefore eliminate complicate operation of preparing the cable for connection of the antenna to the tuner. Further, because of that the antenna module can be folded on the stand plate over the tuner, it is made compact and occupy less space when not in use.

Accordingly, it is a primary object of the present invention to provide an antenna and tuner combination for broadcasting satellite television programs which is capable of being easily mounted indoors to be readily available for enjoying television programs simply by connecting the tuner to the television set and without requiring any complicated installation work, and which is also capable of being stored in a limited space when not in use.

Since the tuner is detachable to the stand plate, it can be separated from the antenna either when the antenna module is required to be installed outdoors or when a like tuner is incorporated in the television set. In either case, the antenna is connected by the use of an additional cable to the tuner or the television set with the like tuner.

It is therefore another object of the present invention to provide an antenna and tuner combination in which the tuner can be separated from the antenna module as necessary.

In a preferred embodiment, the tuner is configured to have a recess in the top surface of a tuner housing for receiving therein a frequency converter projecting on the back of the antenna module when the antenna module is folded over the tuner on the stand plate. With this arrangement, the antenna module can be folded to a reduced thickness to be readily portable and stored into a limited space, which is therefore a further object of the present invention.

Preferably, the tuner incorporates a level meter which indicates an incoming level of the microwaves that the antenna module receives from the broadcasting satellite. Therefore, the antenna module can be easily adjusted into an exact angular positions with the aid of the level meter which is well within the sight of the user handling to adjust the antenna module.

It is therefore a still further object of the present invention to provide an antenna and tuner combination for broadcasting satellite television programs which is capable of being easily and exactly oriented to the broadcasting satellite.

The tuner includes a remote control transmitter which is removably received within a pocket formed in the top surface of the tuner and is closed by the antenna module in the folded position. Thus, the transmitter can be successfully housed between the tuner and the antenna module in the folded position.

The hinge assembly comprises a hinge shaft extending through and supported by a pair of brackets which extend from the stand plate in a spaced relation along an axial direction of the shaft and are allowed to move in the axial direction to some extent. A pair of tabs extends from the antenna module and are positioned axially inwardly of the brackets adjacent thereto in such a relation that the hinge shaft extends through the tabs to rotatably support the antenna module about the hinge shaft. Also included in the hinge assembly are a sleeve ring which is fitted around the hinge shaft between the tabs with its opposite ends abutted against the tabs, respectively, and an operator handle secured to one axial end of the hinge shaft. The hinge shaft is formed with a pair of axially spaced right-hand and left-hand threads which are in threaded engagement with correspondingly threaded holes in the brackets, respectively, such that rotation of the hinge shaft by the handle in one direction causes the brackets to move axially inwardly to thereby tighten the tabs between the brackets and the axial ends of the sleeve, respectively, and that rotation of the hinge shaft in the opposite direction causes the brackets to move axially outwardly to thereby release the tabs from between the brackets and the axial ends of the sleeve, respectively. With this arrangement, it is readily possible to tighten and release the tabs between the brackets and the sleeve ring by manipulation of the operator handle by one hand while adjusting to tilt the antenna module by the other hand.

It is therefore a still further object of the present invention to provide an antenna and tuner combination which is capable of easily adjusting the orientation of the antenna module.

Preferably, the hinge assembly includes at least one spring which urges the antenna module in such a direction as to give a resistance to a movement of folding the antenna module onto the stand plate. Thus, the movement of the antenna module can be dampened when folded onto the stand plate and be well prevented from colliding strongly against the tuner for protection of the antenna module as well as the tuner, which is therefore a still further object of the present invention.

The hinge assembly includes first and second coverings extending around the hinge shaft to conceal therein the brackets as well as the tabs. The first covering extends from the antenna module to be movable therewith relative to the stand plate, while the second covering extends from the stand plate to be held stationary. One of the first and second coverings has a marking which is cooperative with an angle calibration provided on the other of the first and second coverings to indicate an inclination angle at which the antenna module is inclined with respect to the base. With this angular calibration, it is easy to adjust and confirm the angular disposition of the antenna module, which is therefore a still further object of the present invention.

These and still other objects and advantageous features of the present invention will become more apparent from the following description of the preferred embodiment when taken in conjunction with the attached drawings.

DETAILED DESCRIPTION OF THE PREFERRED EMBODIMENT

Figure 1:
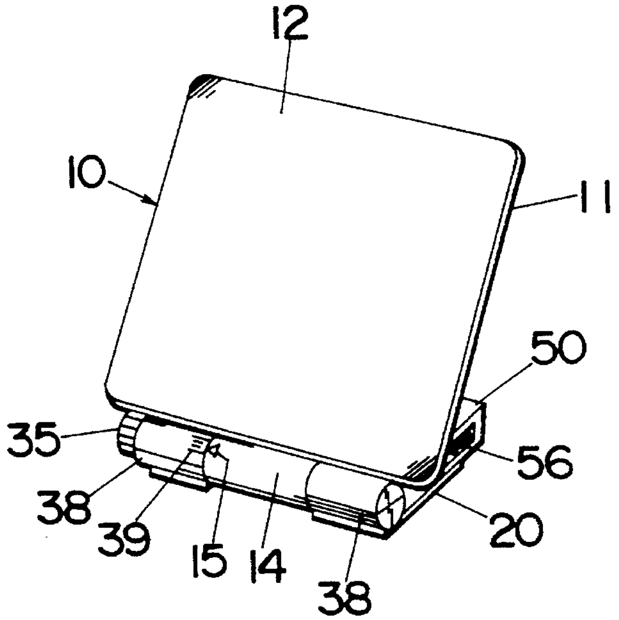
FIG. 1 is a perspective view of an antenna and tuner combination in accordance with a preferred embodiment of the present invention.
Figure 2:
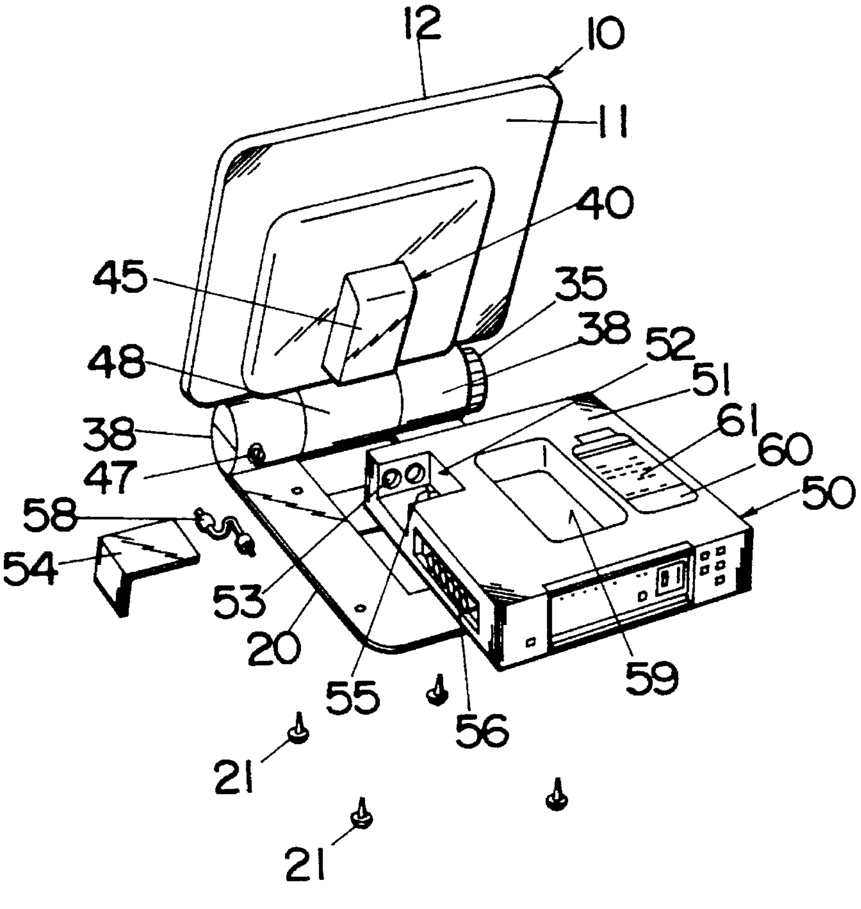
FIG. 2 is an exploded perspective view of the above combination.
Figure 3:
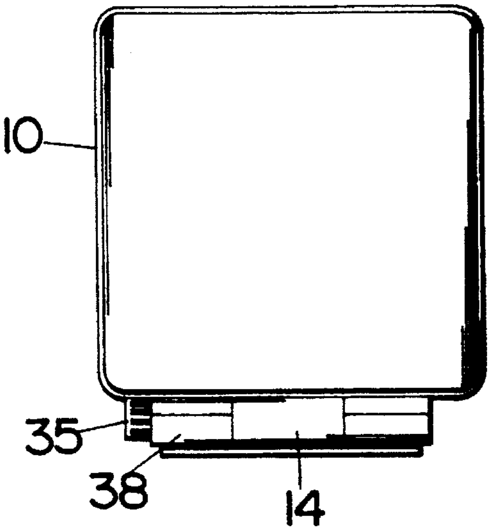
FIGS. 3 to 5 are front, side, and top views, respectively of the above combination with an antenna module shown in its upright position.
Figure 4:
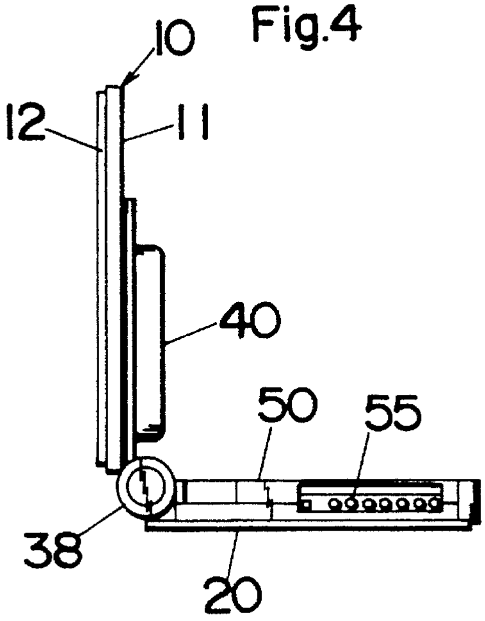
Figure 5:
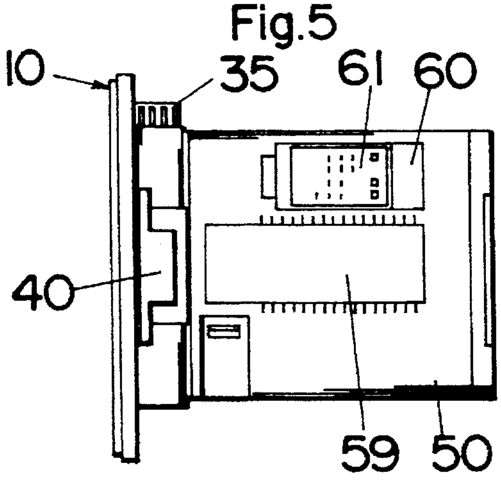
Figure 6:
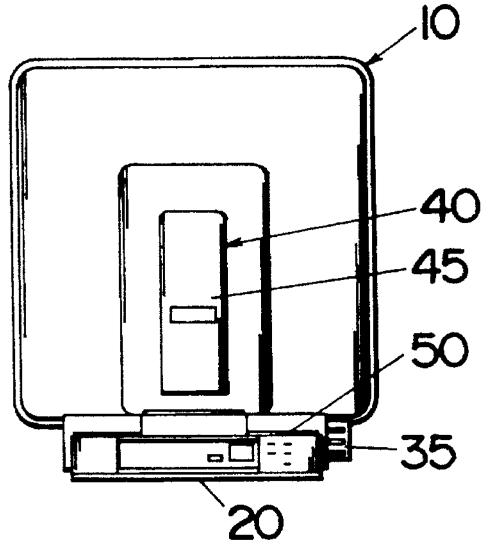
FIGS. 6 and 7 are rear and bottom views of the above combination.
Figure 7:
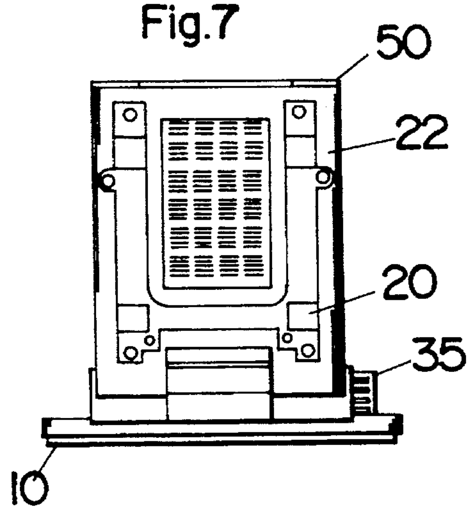
Figure 8:
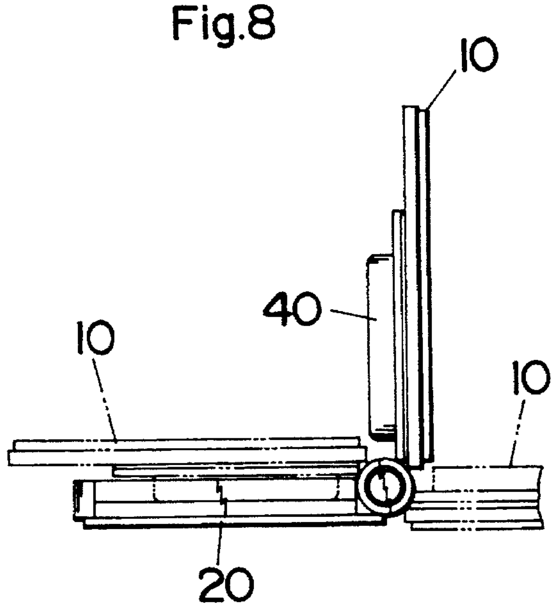
FIG. 8 is a side view of the above combination for illustration of a movable range of the antenna module relative to a stand plate.
Figure 9:
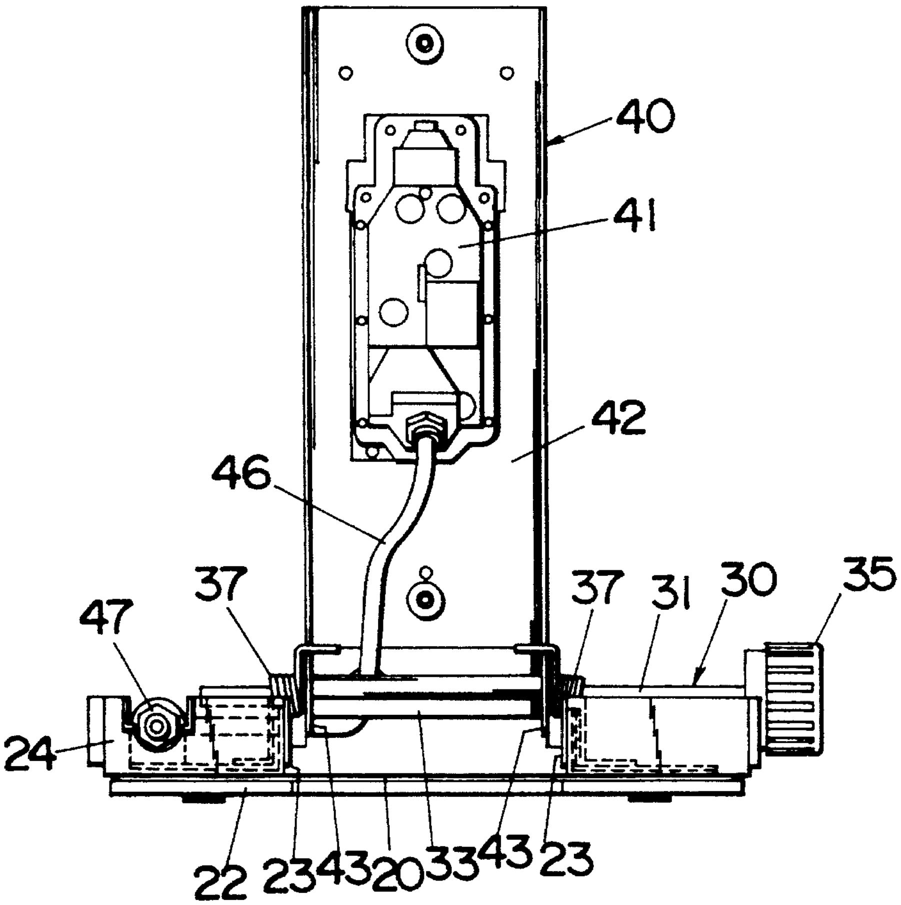
FIG. 9 is a rear view of a hinge assembly connecting the antenna module to the stand plate.

Referring now to FIGS. 1 and 2, there is shown an antenna and tuner combination for receiving microwaves from a geostationary broadcasting satellite in accordance with a preferred embodiment of the present invention. The combination comprises a flat antenna module 10 of a generally square planar configuration with a reduced thickness and a flat stand plate 20 made of a metal sheet into a rectangular configuration having a area less than the antenna module 10. The antenna module 10 is composed of a base 11 mounting an array of antenna elements (not shown) and a covering 12 fitted on the base 11 to conceal therein the antenna elements. The stand plate 20 is adapted to be placed on a supporting surface such as a table and a shelf adjacent a window in order to orient the antenna module 10 to the broadcasting satellite. A rubber sheet 22 is fitted on the bottom of the stand plate 20. The antenna module 10 is supported to the stand plate 10 by means of a hinge assembly 30 so that it is movable between a folded position on the stand plate 10 and an extended position, as indicated by phantom lines in FIG, 8. Projecting on the back of the antenna module 10 is a converter unit 40 which includes a frequency converter 41 connected to the antenna elements for providing a lowered antenna output. As shown in FIG. 9, the converter 41 is supported on a channel member 42 which is in turn secured to the back of the antenna module 10 or the base 11 thereof by screws. A lid 45 is fitted on the back of the antenna module 10 to conceal therein the converter 41. Extending from the converter 41 is a coaxial cable 46 which terminates in a plug-in socket 47 held fixed at one end of the stand plate 20 and defining an antenna output terminal. Detachably mounted on the stand plate 20 is a tuner 50 which has an input terminal 55 for connection with the antenna module 10 and a tuner output terminal 56 for providing video and audio signals to a television set TV though corresponding lines. The tuner 50 is mounted on the stand plate 20 by means of screws 21 and acts to add an extra weight to the stand plate 20 in order to make the combination a self-supporting unit.

The hinge assembly 30 comprises a hinge shaft 31 extending through a pair of brackets 23 secured to the stand plate 20 and through pair of tabs 43 formed at the lower end of the channel member 42. The brackets 23 are movable in an axial direction of the hinge shaft 31 to a limited extent relative to the stand plate 20 and are spaced along the axial direction so as to be positioned immediately outwardly of the adjacent tabs 43 which are also axially spaced. A sleeve 33 of rigid metal is fitted around the hinge shaft 31 between the tabs 43 with the opposite ends of the sleeve 33 kept in closely adjacent relation to the adjacent tabs 43, respectively. The hinge shaft 31 is formed to have an axially spaced pair of right-hand and left-hand threads (not seen) which engages respectively into correspondingly threaded holes (not seen) in the brackets 23 such that when the hinge shaft 31 is rotated in one direction, the brackets 23 are caused to shift axially inwardly to clamp the corresponding tabs 43 between the brackets 23 and the sleeve 33, thereby holding the channel member 42 or the antenna module 10 at a desired angular disposition relative to the stand plate 20. When, on the other hand, the hinge shaft 31 is rotated in the opposite direction, the brackets 23 are caused to shift axially outwardly to release the tabs 43, thereby permitting the antenna module 10 to freely rotatable about the hinge shaft 31. An operator handle 35 is secured to one end of the hinge shaft 31 in order to rotate the hinge shaft 31 for angular adjustment of the antenna module 10 relative to the stand plate 20. That is, the antenna module 10 can be easily adjusted to a desired angular disposition simply by manipulating the operator handle 35 at one hand of a user while turning the antenna module 10 by the other hand. A pair of torsion springs 37 are fitted around the hinge shaft 31 axially outwardly of the brackets 23 in such a manner that each torsion spring 37 has its opposite ends hooked to the corresponding bracket 23 and the tab 43, respectively. Thus arranged torsion springs 37 produce spring biases acting in a direction of urging the antenna module 10 away from the folded position when the antenna module 10 comes nearly folded over the tuner 50 on the stand plate 20, thereby giving a resistance or damping action to the folding motion of the antenna module 10. One of the bracket 23 is formed with a vertical segment 24 which is utilized to mount the socket 47 at the end of the cable 46 extending from the converter 41. A pair of cylindrical caps 38 each composed of two halves are provided at portions axially outwardly of the brackets to conceal therein the corresponding portion of the hinge assembly 30. The remaining portion of the hinge assembly 30 is covered by a like cylindrical cap composed of an arcuate tongue 48 extending integrally from the lid 45 and a complementary member 14 extending integrally from the base 11 of the antenna module 10. As seen in FIG. 1, one of the cap 38 is formed with an angular calibration 39 which is cooperative with a marking 15 on the member 14 to indicate an angle at which the antenna module 10 is tilted in relation to the stand plate 20.

Figure 10:
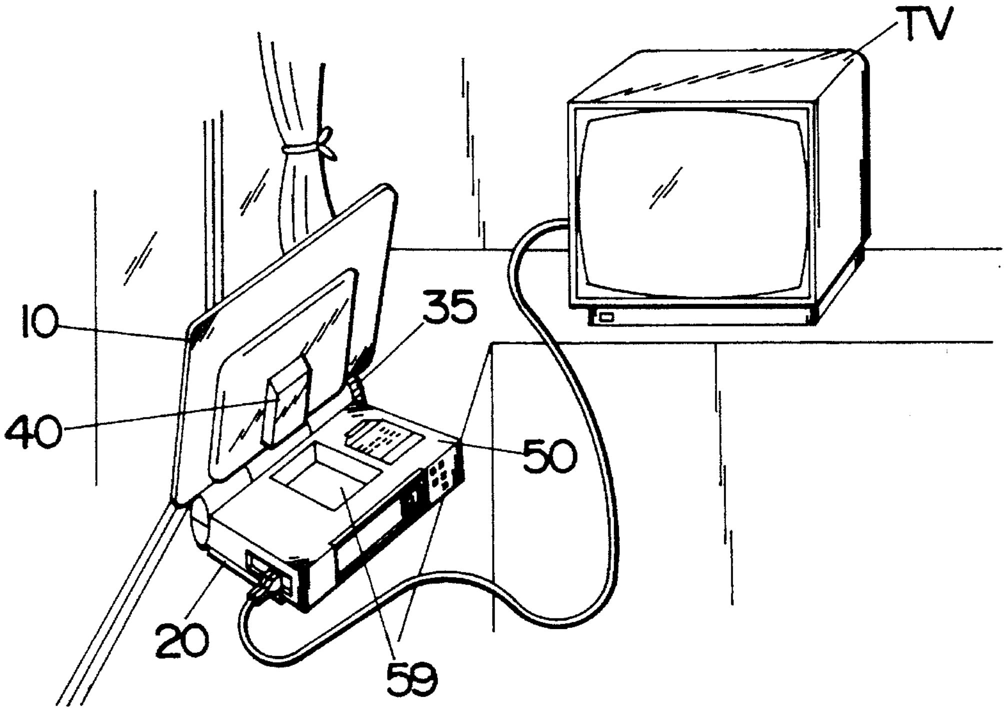
FIG. 10 is a perspective view illustrating a typical use of the above combination.

Formed in the rear end of a tuner housing 51 is a small compartment 52 with an opening 53 through which the socket 47 or the antenna output terminal extends. The input terminal 55 is provided in the form of a plug-in socket and projects into the compartment 52 in an opposed relation to the socket 47 or the antenna output terminal. The antenna output terminal 47 is connected to the tuner input terminal 55 by way of a short cable 58 provided at its opposite ends with plugs for insertion respectively into the sockets 47 and 55. It should be noted in this connection that the tuner input terminal 55 may be configured to be directly connected to the antenna output terminal 47 without relying upon the cable 58. A lid 54 is fitted to close the compartment 52. The tuner output terminal 56 is configured to have a plurality of slots for providing video and audio signals or other related signals to the television set TV though suitable cords or cables. As exemplarily shown in FIG. 10, the antenna and tuner combination can be mounted on a table or shelf adjacent a window with the tuner 50 connected to the television set TV through the cords. At this condition, azimuth as well as the angle of elevation of the antenna module 10 is adjusted by turning the stand plate 20 and by tilting the antenna module 10 in order to orient the antenna module 10 to the broadcasting satellite. The tuner 50 is energized by an electric mains through a power cord (not seen) plugged into a corresponding power terminal of the tuner 50.

The tuner 50 includes a level meter in a front display which indicates an incoming level of the antenna output in a digital representation. With the provision of the level meter, the user is constantly informed of the instantaneous incoming level of the antenna output just at the installation site while adjusting the orientation of the antenna module and therefore the user can readily adjust the antenna to a correct position. Formed in the top surface of the tuner housing 51 is a recess 59 which is dimensioned to receive therein the converted unit 40 so that the antenna module 10 can be folded into a compact and flat structure. Also formed in the top surface of the tuner housing 51 is a pocket 60 for detachably receiving therein a remote control transmitter 61 for the tuner 50. The pocket 60 is closed by the antenna module 10 in the folded position so that the transmitter 61 can be safely stored therein when the antenna and the tuner combination is not in use.

As described in the above, because of that the antenna module can folded into a compact structure with the tuner 50 interposed between the antenna module 10 and the stand plate 20, the combination can be easily portable from one place to the other and even to an outdoor so that the broadcasting satellite television program can be readily enjoyed in the outdoors where the power source is available. Also, the combination can stored in a limited space when not in use.

Figure 11:
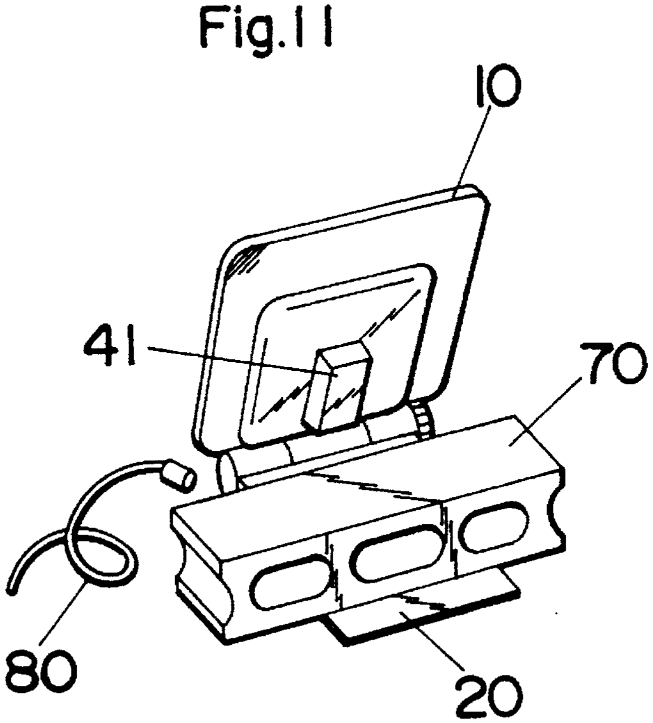
FIGS. 11 and 12 are schematic views respectively illustrating examples for installation of the antenna module at outdoor locations with the tuner detached therefrom.
Figure 12:
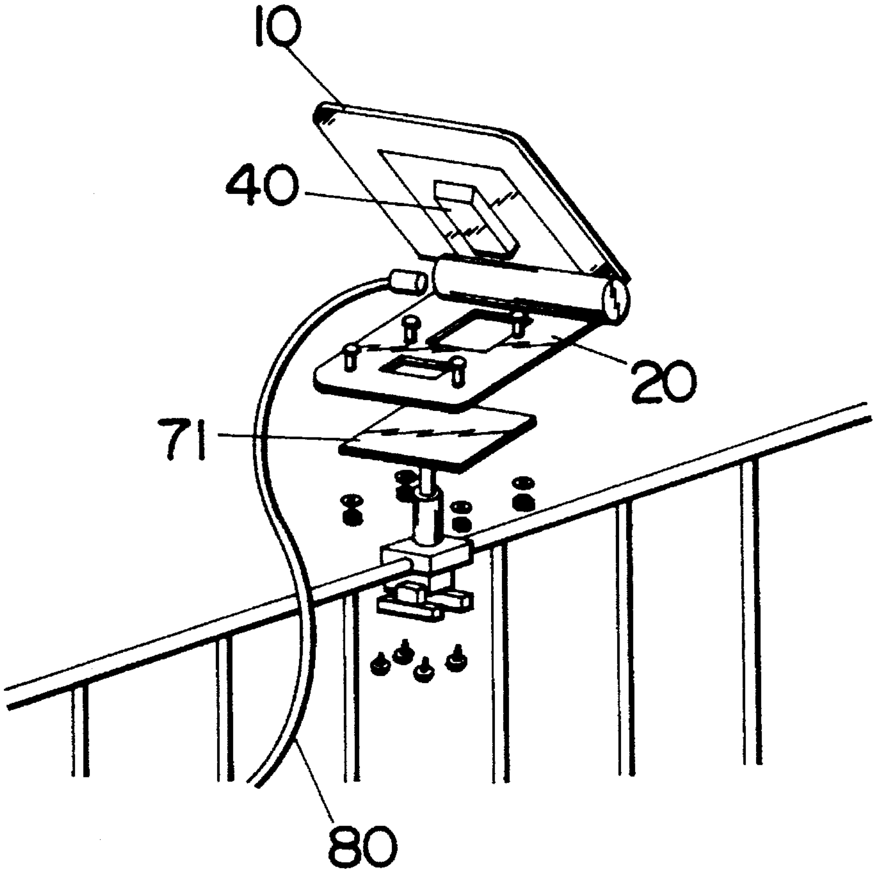

When the antenna module 10 is required to be installed outdoors as separated from the tuner 50, it can be directly mounted on a supporting floor in such a manner as to place a concrete block 70 or the like weight on the stand plate 20, as shown in FIG. 11, or mounted on a fence or the like building structure by means of a suitable fittings 71, as shown in FIG. 12. When the tuner 50 is detached from the stand plate 20, the socket 47 or the antenna output terminal is exposed on the stand plate 20, therefore the antenna module 10 can be connected through a suitable coaxial cable 80 to a different tuner or directly to a television set incorporating a like tuner.

What is claimed is:

1. An antenna and tuner combination for receiving microwaves from a broadcasting satellite, comprising:

a stand plate;

a flat planar antenna module connected by a hinge assembly to said stand plate in a supported relation thereto so as to be movable between a folded position upon said stand plate and an extended position extending from said stand plate, said antenna module having an output terminal;

adjustor means for adjusting the antenna module to a desired angular disposition with respect to a plane of said stand plate and holding it at said desired angular disposition; and a tuner detachably mounted on said stand plate and having an input terminal detachably connected to said output terminal of said antenna module and a tuner output terminal for providing video and audio signals to a television set, said antenna module including a frequency converter which is disposed to project on the back of said antenna module, said frequency converter being received within a recess formed in the top surface of said tuner when said antenna module is folded over said tuner on said stand plate;

wherein said hinge assembly comprises a hinge shaft extending through and supported by a pair of brackets which extend from said stand plate and are spaced in an axial direction of said hinge shaft, a pair of tabs extending from said antenna module and positioned axially inwardly of said pair of brackets adjacent thereto in such a relation that said hinge shaft extends through said tabs to rotatably support said antenna module about said hinge shaft, a sleeve ring fitted around said hinge shaft between said tabs with its opposite ends abutted against said tabs, respectively, and an operator handle secured to one axial end of said hinge shaft, said brackets being allowed to move in said axial direction to a limited extent, said hinge shaft formed with a pair of axially spaced right-hand and left-hand threads which are in threaded engagement with correspondingly threaded holes in said brackets, respectively, such that rotation of said hinge shaft by said handle in one direction causes said pair of brackets to move axially inwardly to tighten said tabs between said pair of brackets and the axial ends of said sleeve ring, respectively, and that rotation of said hinge shaft in the opposite direction causes said pair of brackets to move axially outwardly to release said tabs from between said pair of brackets and the axial ends of said sleeve ring, respectively.

2. An antenna and tuner combination as set forth in claim 1, wherein said hinge assembly includes at least one spring which urges said antenna module in such a direction as to give a resistance to a movement of folding said antenna module onto said stand plate.

3. An antenna and tuner combination as set forth in claim 1, wherein said hinge assembly includes first and second coverings extending around said hinge shaft to conceal therein said brackets as well as said tabs, said first covering extending from said antenna module to be movable therewith relative to said stand plate, said second covering extending from said stand plate to be held stationary, one of said first and second coverings having a marking which is cooperative with an angle calibration provided on the other of said first and second coverings to indicate an inclination angle at which said antenna module is inclined with respect to said stand plate.

* * * * *